Figure 1:
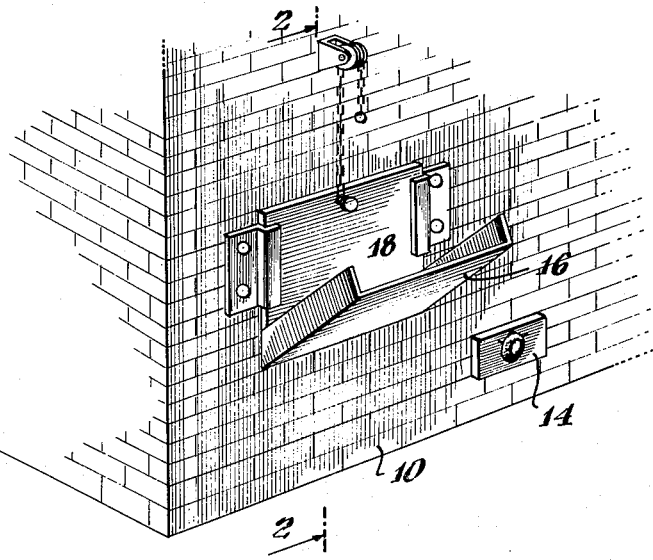

July 25, 1961 C. KAITZ 2,993,832
POULTRY AND EGG FUMIGATION PROCESS
Filed Dec. 24, 1956

INVENTOR
Charles Kaitz
BY
Eyre, Mann & Lucas
ATTORNEYS

United States Patent Office 2,993,832
Patented July 25, 1961

2,993,832
POULTRY AND EGG FUMIGATION PROCESS
Charles Kaitz, Vineland, N.J., assignor to Vineland Poultry Laboratories, Vineland, N.J., a partnership
Filed Dec. 24, 1956, Ser. No. 630,348
7 Claims. (Cl. 167—53.1)

One of the recognized methods of combating poultry diseases such as pullorum and omphalitis involves treatment of incubating eggs or new-born chicks with formaldehyde gas. The gas is ordinarily generated by chemical reaction between formalin (37–40% aqueous solution of formaldehyde) and potassium permanganate or by evaporating formalin from a saturated length of cheesecloth hung in a chamber containing incubating eggs or new-born chicks. Fumigation is continued for about 15 mintues and then the chamber is either ventilated to flush the gas out or aqueous ammonia is poured on the floor of the chamber and the liberated ammonia gas reacts with formaldehyde to stop fumigation.

Although the cheesecloth and potassium permanganate processes are now in use, they are so difficult to control that it is virtually impossible to achieve proper fumigation to effectively combat poultry diseases. If concentration of formaldehyde gas is low, it will not stop disease from developing. On the other hand, high concentrations of gas especially over prolonged periods of time may adversely affect the development of the chicks, producing such conditions as unhealed navels. Prolonged treatment at high gas concentrations may also result in sticky chicks, and in severe cases, death.

The prior art method of hanging cheesecloth up to generate formaldehyde gas is very crude and there is no way of telling what the gas concentration will be. Chemical reaction of potassium permanganate with formalin is somewhat better but the reaction is quite violent and unpredictable. As a result, anything can happen and the reaction may not be complete and may fail to generate the required amount of formaldehyde gas, or as frequently happens a supply of formalin solution is stored and used over a prolonged period of time so that it loses strength and even if the amount of formalin solution reacted with potassium permanganate is accurately measured, the amount of formaldehyde gas generated will be different each time the solution is used. Stopping the fumigation process either by neutralizing the formaldehyde gas with ammonium solution or by allowing the gas to ecape from the chamber is a difficult and sometimes dangerous procedure as the hatchery man must expose himself to concentrated formaldehyde gas fumes.

In accordance with the present invention these difficulties have been overcome and there has been devised an improved process for fumigating eggs and new-born chicks with formaldehyde gas which enables the hatcheryman to achieve uniform conditions of treatment for effective control of poultry diseases. In the present process paraformaldehyde is heated under controlled conditions which insure rapid depolymerization and conversion of all of the paraformaldehyde to the gaseous state. Since all of the paraformaldehyde is used up a definite amount of gas is generated and the gas quickly fills the chamber to start fumigation at the desired concentration. After fumigation has been continued for a predetermined period of time, it is quickly and effectively stopped by generating hot ammonia gas in the chamber. This is done by heating a material such as ammonium carbonate which when heated readily gives up a definite amount of ammonia gas. Since the ammonia gas is hot, it quickly fills the chamber to react with formaldehyde and by generating a stoichiometric amount of hot ammonia gas fumigation is stopped without leaving any substantial excess of gas to contend with. While the ammonia gas does not in fact neutralize the formaldehyde gas in a strict technical sense, we have selected the term "neutralizing agent" to describe those salts and other known materials which may be used in my process for stopping the fumigating action of the formaldehyde gas. As used throughout the specification and claims the term "neutralizing agent" is intended to mean those substances which when heated readily give up ammonia gas.

Another important advantage of my process is that the formaldehyde gas liberated by heating paraformaldehyde is pure and the gas contains no contaminants such as methanol or formic acid which are found in substantial quantities in gases generated in accordance with prior art processes. Still another advantage of my process is that the formaldehyde gas is dry and it is believed that dry formaldehyde gas is a more effective fumigant than the wet formaldehyde gas generated with aqueous formalin solutions of the prior art. While the exact reason for this is not yet fully understood it may well be that the dry gas with low vapor pressure tends to condense more readily in the moisture on the surface of incubating eggs and new-born chicks to give a much greater concentration of formaldehyde and more vigorous treatment than is possible with the wet gases of the prior art processes. Regardless of the true explanation which may finally be proven it is a fact that my process has already proven to be highly effective and much more economical to carry out than the processes of the prior art. Comparative cost analysis show that the process of the present invention is about five times less expensive to carry out than the permanganate process and this is of tremendous commercial advantage.

A simple form of apparatus suitable for carrying out the process of the present invention is illustrated in the drawings in which FIG. 1 is a perspective view illustrating part of a chamber which may contain incubating eggs or new-born chicks.

Figure 2:
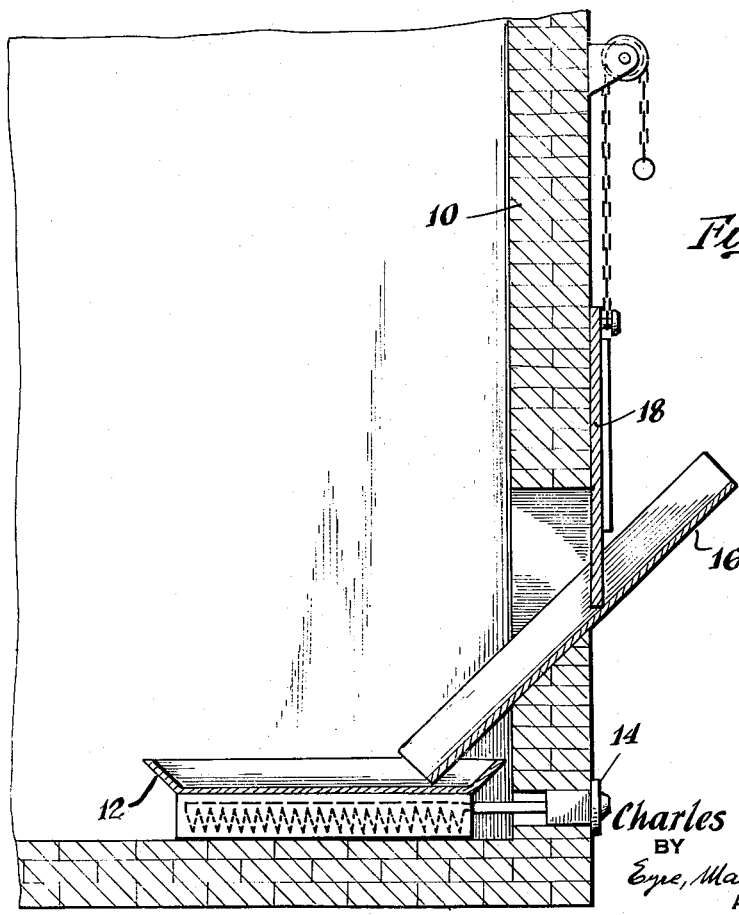

FIG. 2 is a sectional view taken on line 2—2 of FIG. 1.

Referring to the drawings, 10 is the side wall of a chamber which may be used for incubating eggs or hatching out chicks. Air fans, temperature and humidity controls and interior arrangement of the chamber are not shown as these are well known in the art and are not of my invention. Within the chamber is a hot plate 12 with conventional electric heating means and a rheostat type switch 14 for the hot plate is positioned on the exterior surface of wall 10 so that temperature of the hot plate may be controlled from outside the chamber. Heat generated by hot plate 12 is adequate to completely depolymerize paraformaldehyde and convert it to the gaseous state. In general I have found that a hot plate capable of reaching and maintaining a temperature of about 300° F. is adequate for my purpose. Excellent results have been achieved with a hot plate temperature of 300° F. in a 100 cubic foot chamber using about 8.4 grams of paraformaldehyde. In such case all of the paraformaldehyde is converted to gas in about one minute. Of course as the size of the chamber and amount of paraformaldehyde employed is increased the temperature of the hot plate is also increased. A hot plate temperature below 300° F. is not desirable as in such case the formaldehyde gas is only slowly generated and the advantage of quickly starting fumigation process at maximum gas concentration may be lost. The temperature of the hot plate may exceed 700° F. but this is not necessary and only makes the equipment more expensive. A slide 16 is positioned in an opening in wall 10 and as shown in the drawing the slide is so arranged that the paraformaldehyde and ammonium carbonate will readily feed down the slide to the hot plate under the influence of gravity. A closure member such as trap door 18 is arranged to slide up and down on the exterior of wall 10 so that the opening for slide 16 may be closed to keep the chamber as air tight as possible. This assists automatic equipment (not shown) in maintaining the proper temperature and humidity for incubating eggs or hatching chicks.

Operation of the illustrative form of apparatus is obvious. Fumigation is carried out by turning on switch 14 to bring hot plate 12 up to operating temperature. After this is done trap door 18 is opened and paraformaldehyde is fed down slide 16 to the hot plate. The time is recorded and then after fumigation is completed the trap door is again opened and ammonium carbonate is fed down the slide to hot plate 12. This results in generating hot ammonia gas which reacts with the formaldehyde to stop the fumigation process. After the ammonium carbonate is vaporized, the hot plate is turned off which completes the operation. It will be obvious to those skilled in the art that automatic controls may be used for operating the slide and turning off the hot plate.

Details of the process of the present invention are best understood in connection with an illustrative example.

*Example I*

One hundred and seventeen eggs, each candled to be sure it contained a live embryo, were placed in the chamber of a commercial type incubator of about 100 cubic feet capacity and on the 18th day of incubation the eggs were fumigated by evaporating 10 grams of powdered paraformaldehyde on a hot plate which had previously been heated to a temperature of about 500° F. The paraformaldehyde was completely vaporized in one minute and thereafter fumigation was continued for 10 minutes. Then 26.4 grams of ammonia bicarbonate were placed on the hot plate to generate hot ammonia gas. All of the ammonium bicarbonate was used up in about 3 minutes and the formaldehyde gas was found to be completely neutralized about 2 minutes later. Three days later (21st day) the eggs started to hatch and after seventeen chicks had come out of the shell the chamber was again fumigated using 10 grams of powdered paraformaldehyde and 26.4 grams of ammonium bicarbonate. The new-born chicks were fumigated using the method specified above for the incubating eggs with the single exception that the ammonium bicarbonate was placed on the hot plate three minutes after all of the paraformaldehyde had been evaporated. One hundred and three eggs were hatched out. All chicks were alive and healthy and no unhealed navels were found.

*Example II*

The procedure, ingredients and amounts of ingredients specified in Example I were employed with the exception that ammonium carbonate was used in place of ammonium bicarbonate. 89% of the fertile eggs were hatched out. All chicks were alive and healthy.

*Example III*

The procedure, ingredients and amounts of ingredients specified in Example I were employed with the single exception that ammonium oxalate was used in place of the ammonium bicarbonate of Example I. Chicks were alive and healthy and 87% of the eggs were hatched out.

As is customary in the poultry industry, fumigation with formaldehyde gas should not be attempted until eggs have been under incubation for at least 72 hours and new-born chicks must be fumigated before their fuzz dries out. Otherwise there is danger of killing the hatch.

As to ingredients, paraformaldehyde employed in my process is the standard grade readily available on the open market and either the flake or powdered form may be employed. Any material that liberates ammonia gas when heated may be used for generating hot ammonia gas for reaction with formaldehyde and the cheapest and best materials for this purpose are ammonium carbonate and ammonium bicarbonate. The concentration of formaldehyde gas to be employed and time of treatment will of course change depending upon the particular disease which has to be controlled and the standards now in use are employed in carrying out my process. In keeping with existing standards about 5.0 to 20 grams of paraformaldehyde are required for each 100 cubic feet of chamber space and the formaldehyde gas treatment is continued for about 2 to 10 minutes. About 12 to 30 grams of ammonium carbonate, 20 to 50 grams of ammonium bicarbonate and about 15 to 35 grams of ammonium oxalate are required for reaction with formaldehyde generated with the specified amounts of paraformaldehyde. In this connection it will be understood that after fumigation is complete, part of the formaldehyde will be in the form of gas and the remainder will be found in condensed moisture which is always present in the chamber because of the humid atmosphere maintained therein.

It will also be understood that it is intended to cover all changes and modifications of the preferred form of invention herein chosen for the purpose of illustration which do not constitute departures from the spirit and scope of my invention.

What I claim is:

1. The method of controlling poultry diseases by fumigating eggs in the chamber of an incubator held under controlled conditions of temperature and humidity which comprises the steps of introducing into the chamber a predetermined quantity of solid paraformaldehyde, generating dry heat free of volatile contaminants, applying such dry heat to the solid paraformaldehyde to raise its temperature and cause rapid conversion of the solid into dry formaldehyde gas, continuing the application of dry heat to the solid paraformaldehyde to cause the initially dry formaldehyde gas to disperse rapidly throughout such chamber and to convert all the solid paraformaldehyde to the gaseous state and provide a definite predetermined quantity of gas in the chamber for fumigating the eggs therein to combat poultry diseases.

2. The method of controlling poultry diseases by fumigating eggs in the chamber of an incubator held under controlled conditions of temperature and humidity which comprises the steps of introducing into the chamber a predetermined quantity of solid paraformaldehyde, generating dry heat free of volatile contaminants, applying such dry heat to the paraformaldehyde to raise its temperature and cause rapid conversion of the solid into dry formaldehyde gas, continuing the application of dry heat to the solid paraformaldehyde to cause the initially dry formaldehyde gas to disperse rapidly throughout said chamber and to convert all the solid paraformaldehyde to the gaseous state and provide a definite predetermined quantity of gas in the chamber for fumigating the eggs therein and then after a predetermined period of time applying dry heat free of contaminants to a predetermined quantity of a solid neutralizing agent which when heated rapidly generates dry hot ammonium gas in the chamber and continuing the application of dry heat to such neutralizing agent until all of it has been converted to the gaseous state to provide a stoichiometric amount of hot ammonium gas and to disperse the initially dry ammonium gas rapidly throughout the chamber for reaction with the formaldehyde gas to stop the fumigation process at a predetermined period of time for the particular poultry disease under treatment.

3. The method specified in claim 2 in which the neutralizing agent that is heated to generate hot ammonium gas is selected from the group consisting of ammonium carbonate, ammonium bicarbonate and ammonium oxalate.

4. The method of controlling poultry diseases by fumigating eggs in the chamber of an incubator held under controlled conditions of temperature and humidity which comprises the steps of introducing into the chamber between about 5 to 20 grams of solid paraformaldehyde for each 100 cubic feet of chamber space, generating dry heat free of volatile contaminants, applying such dry heat to the solid paraformaldehyde to raise its temperature to at least 300° F. to cause rapid conversion of solid paraformaldehyde into dry formaldehyde gas, continuing the application of dry heat to the paraformaldehyde until all of it has been converted to the gaseous state to provide a definite predetermined quantity of gas in the chamber and to disperse the initially dry formaldehyde gas rapidly throughout said chamber, maintaining the formaldehyde gas in said chamber from about 2 to 10 minutes for fumigating the eggs therein and then after the fumigation operation is complete applying dry heat free of contaminants at a temperature of at least 300° F. to a predetermined quantity of a solid neutralizing agent which when heated rapidly generates dry hot ammonium gas in the chamber and continuing the application of dry heat to such neutralizing agent until all of it has been converted to the gaseous state to provide a stoichiometric amount of hot ammonium gas and to disperse the initially dry ammonium gas rapidly throughout the chamber for reaction with the formaldehyde gas to stop the fumigation process at a predetermined period of time for the particular poultry disease under treatment.

5. The method of controlling poultry diseases by fumigating chicks in a hatching chamber held under controlled conditions of temperature and humidity which comprises the steps of introducing into the chamber a predetermined quantity of solid paraformaldehyde, generating dry heat free of volatile contaminants, applying such dry heat to the paraformaldehyde to raise its temperature and cause rapid conversion of the paraformaldehyde into dry formaldehyde gas, continuing the application of dry heat to the paraformaldehyde until all of it has been converted to the gaseous state to provide a definite predetermined quantity of gas in the chamber and to disperse the initially dry formaldehyde gas rapidly throughout such chamber for fumigating the chicks therein.

6. The method of controlling poultry diseases by fumigating chicks in a hatching chamber held under controlled conditions of temperature and humidity which comprises the steps of introducing into the chamber a definite predetermined quantity of solid paraformaldehyde, generating dry heat free of volatile contaminants, applying the dry heat to the solid paraformaldehyde to raise its temperature and cause rapid conversion of the solid paraformaldehyde into dry formaldehyde gas, continuing the application of dry heat to the paraformaldehyde until all of it has been converted to the gaseous state to provide a predetermined quantity of gas in the chamber and to disperse the initially dry formaldehyde gas rapidly throughout said chamber for fumigating the chicks therein and then after a predetermined period of time, applying dry heat free of contaminants to a predetermined quantity of a solid neutralizing agent which when heated rapidly generates dry hot ammonium gas in the chamber and continuing the application of dry heat to such neutralizing agent until all of it has been converted to the gaseous state to provide a stoichiometric amount of hot ammonium gas and to disperse the initially dry ammonium gas rapidly throughout the chamber for reaction with the formaldehyde gas to stop the fumigation process at a predetermined period of time for the particular poultry disease under treatment.

7. The method of treating eggs and chicks in incubator and hatcher chambers which comprises the steps of introducing into the chamber a predetermined quantity of solid paraformaldehyde, generating dry heat free of volatile contaminants, applying such dry heat to the paraformaldehyde to convert the solid into dry formaldehyde gas, continuing the application of dry heat to cause dispersion of the formaldehyde gas throughout the chamber, applying dry heat after a predetermined period of time to a predetermined quantity of a solid neutralizing agent which when heated generates hot ammonia gas in the chamber, and continuing the application of dry heat to such neutralizing agent until a sufficient quantity of hot ammonia gas has been generated and dispersed throughout the chamber to react with the formaldehyde gas and stop the fumigation process.

References Cited in the file of this patent

UNITED STATES PATENTS

| | | |
|---|---|---|
| Re. 22,284 | Griffith | Mar. 9, 1943 |
| 630,782 | Schmidt | Aug. 8, 1899 |
| 790,468 | Walker | May 23, 1905 |
| 1,191,647 | Anhaltzer | July 18, 1916 |
| 1,837,264 | Hackley | Dec. 22, 1931 |
| 2,147,236 | Biggs | Feb. 14, 1939 |
| 2,164,316 | Engels | July 4, 1939 |
| 2,254,276 | Ellis | Sept. 2, 1941 |

FOREIGN PATENTS

| | | |
|---|---|---|
| 737,893 | Great Britain | Oct. 5, 1955 |

OTHER REFERENCES

Kendall Smiths Inorganic Chem., The Century Co., New York, 1926, p. 710.